United States Patent
Fabien et al.

(10) Patent No.: US 9,386,543 B2
(45) Date of Patent: Jul. 5, 2016

(54) METHODS AND DEVICES FOR CALCULATION OF UPLINK TRANSMISSION POWER

(71) Applicant: Google Technology Holdings LLC, Mountain View, CA (US)

(72) Inventors: Jean-Aicard Fabien, Lincolnshire, IL (US); Colin D. Frank, Park Ridge, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 36 days.

(21) Appl. No.: 14/257,136

(22) Filed: Apr. 21, 2014

(65) Prior Publication Data
US 2015/0304962 A1    Oct. 22, 2015

(51) Int. Cl.
*H04W 52/24* (2009.01)
*H04W 52/36* (2009.01)
*H04W 52/32* (2009.01)
*H04W 52/14* (2009.01)
*H04W 72/04* (2009.01)

(52) U.S. Cl.
CPC .......... *H04W 52/247* (2013.01); *H04W 52/367* (2013.01); *H04W 52/146* (2013.01); *H04W 52/325* (2013.01); *H04W 72/042* (2013.01); *Y02B 60/50* (2013.01)

(58) Field of Classification Search
CPC .............. H04W 72/0473; H04W 72/0413; H04W 52/146; H04W 52/247; H04W 52/365
See application file for complete search history.

(56) References Cited

U.S. PATENT DOCUMENTS

| 2013/0148591 | A1 | 6/2013 | Lim et al. | |
| 2013/0182661 | A1 | 7/2013 | Piipponen et al. | |
| 2014/0378180 | A1* | 12/2014 | Schwent | H04W 52/243 455/522 |
| 2015/0181517 | A1* | 6/2015 | Lee | H04W 52/0206 370/311 |

FOREIGN PATENT DOCUMENTS

EP    2557708 A1 *  2/2013  ............. H04L 5/001

OTHER PUBLICATIONS

Motorola Mobility, 3GPP Draft F4-146503, "A-MPR for Contiguous CA with Almost-Contiguous Resource Allocations and CA_NS Signalling," Sep. 30, 2014.
European Patent Office, International Search Report and Written Opinion for PCT Application No. PCT/US2015/026789 (related to above-captioned patent application), mailed Jul. 7, 2015.

* cited by examiner

*Primary Examiner* — Siming Liu
(74) *Attorney, Agent, or Firm* — Faegre Baker Daniels LLP (57) ABSTRACT

This disclose sets forth methods and devices for calculation of uplink transmission power. An indication of a non-contiguous allocation of resource blocks for an uplink transmission is received. A first additional maximum power reduction ("A-MPR") is determined based on a smallest contiguous allocation containing the non-contiguous allocation and an allocation correction factor. A second A-MPR is determined as a non-contiguous resource allocation A-MPR for the non-contiguous resource allocation. An uplink transmission power is calculated based on a lesser of the first A-MPR and the second A-MPR. The uplink transmission is performed based on the uplink transmission power.

20 Claims, 6 Drawing Sheets

METHODS AND DEVICES FOR CALCULATION OF UPLINK TRANSMISSION POWER

TECHNICAL FIELD

The present disclosure is related generally to wireless network communication and, more particularly, to determination of uplink transmission power for non-contiguous resource-block allocations.

BACKGROUND

Carrier aggregation is a feature for increasing average user throughput of mobile stations by enabling the mobile station to exploit unused resources on a secondary component carrier. In the absence of carrier aggregation, the resource blocks on the two component carriers are segregated so that mobile stations assigned to a first component carrier cannot be allocated unused resources on the second component carrier. Carrier aggregation is especially beneficial if the loading of the two component carriers is unbalanced so that many of the resource blocks on the second component carrier would be unused if they cannot be assigned to mobile stations on the first component carrier. Carrier aggregation also increases the peak data rate achievable by the mobile station; however, reduced transmission power levels may be required on the mobile station to meet emissions requirements and to reduce interference in adjacent channels due to non-linear characteristics of mobile station power amplifiers. In some cases of uplink carrier aggregation, a required additional maximum power reduction ("A-MPR") for determining uplink transmission power is large. The A-MPR allowed for uplink carrier aggregation is specified in two different ways for non-contiguous allocations and contiguous allocations.

For non-contiguous allocations (e.g., allocations with multiple clusters), the A-MPR is specified as a function of an allocation ratio A of the non-contiguous allocation. The allocation ratio is the ratio of a number of allocated resource blocks to a total number $N_{RB\_agg}$ of aggregated resource blocks available for the uplink transmission. For contiguous allocations, the A-MPR is specified using a table lookup. A contiguous allocation is defined as an allocation which has no unallocated resource blocks between a first allocated resource block and a last allocated resource block. An allocation which spans a boundary between first and second aggregated carriers is said to be contiguous if there are no gaps except for internal guard bands between the first and second aggregated carriers. In this case, the last resource block of the first aggregated carrier and the first resource block of the second aggregated carrier are both allocated.

The A-MPR allowed for contiguous allocations is typically significantly less than is allowed for non-contiguous allocations. However, the tables defined for contiguous allocations cannot be used for allocation ratios greater than 0.5 for any subframe in which a physical uplink control channel ("PUCCH") is transmitted (e.g., by other mobile stations) on either of the two contiguous carriers because any such allocation will be "punctured" by resource blocks for the PUCCH. Since the PUCCH is used for acknowledgement, negative acknowledgement, and channel-state information, most subframes will include a PUCCH transmission and for these subframes, and the tables for contiguous allocations cannot be used.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The various embodiments described herein allow a mobile station to calculate an uplink transmission power using a reduced A-MPR. This technique reduces the uplink transmission power reduction allowed to the mobile station in order to meet network-signaled emissions requirements.

According to an embodiment of the disclosure, the mobile station receives an indication of a non-contiguous allocation of resource blocks for an uplink transmission. The mobile station determines a first A-MPR based on a smallest contiguous allocation containing the non-contiguous allocation and an allocation correction factor. The mobile station determines a second A-MPR as a non-contiguous resource allocation A-MPR for the non-contiguous resource allocation. The mobile station calculates an uplink transmission power based on a lesser of the first A-MPR and the second A-MPR. The mobile station then performs the uplink transmission based on the uplink transmission power.

Figure 1:
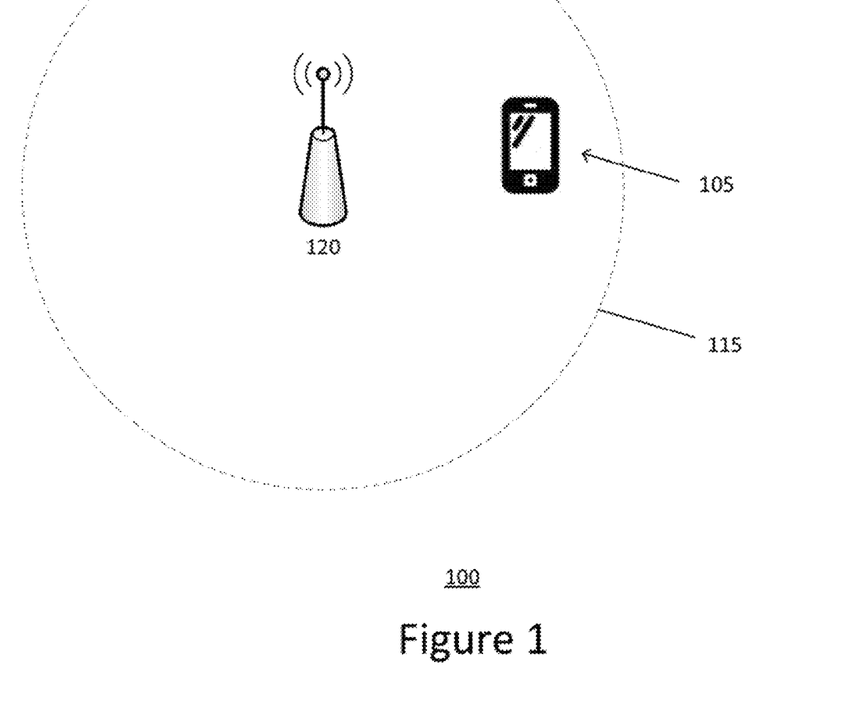
FIG. 1 is an overview of a representative communication system in which the methods of this disclosure may be practiced.

Turning to FIG. 1, a block diagram 100 illustrates a mobile station 105 and a wireless network 115. The mobile station 105 is configured for communication with the wireless network 115 via a base station 120. Possible implementations of the mobile station 105 include a mobile phone (e.g., smartphone), a tablet computer, a laptop, or other computing device. In one embodiment, the wireless network 115 is a cellular (e.g., long term evolution) network.

Figure 2:
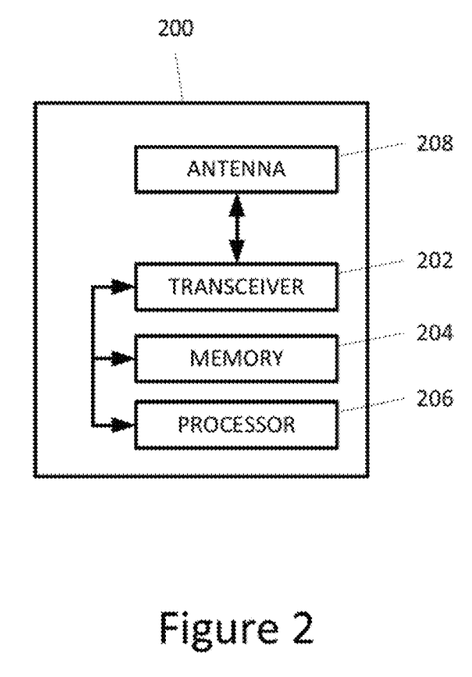
FIG. 2 is a generalized schematic of a representative base station.

Turning to FIG. 2, a block diagram 200 illustrates an embodiment of a base station such as the base station 120 of FIG. 1. Possible implementations of the base station include an Evolved Universal Terrestrial Radio Access base station, an Evolved NodeB ("eNB"), a transmission point, a Remote Radio Head, a home eNB, and a femtocell. In one example, the base station is an eNB that controls a macrocell of the wireless network 115. The base station may include multiple network entities. For example, the base station may in fact be two or more base stations operating in conjunction with one another to operate as a single base station or network entity. The base station may also be a portion of another network entity.

The base station includes a transceiver 202, which is configured to transmit data to and receive data from other devices such as the mobile station 105. The base station also includes at least one memory 204 and a processor 206 that executes programs stored in the memory 204. The processor 206 writes data to and reads data from the memory 204. During operation, the transceiver 202 receives data from the processor 206 and transmits Radio Frequency ("RF") signals representing the data via antenna 208. Similarly, the transceiver 202 receives RF signals, converts the RF signals into appropriately formatted data, and provides the data to the processor 206. The processor 206 retrieves instructions from the memory 204 and, based on those instructions, provides outgoing data to, or receives incoming data from the transceiver 202.

The base station is configured to allocate radio resources (e.g., frames, subframes, resource blocks, uplink carriers, downlink carriers, subcarriers) for mobile stations, such as the mobile station 105. The radio resources can be allocated for communication between a mobile station and the base station, such as an uplink transmission from the mobile station to the base station. The base station is configured to send a control message that indicates allocated radio resources to the mobile station. The control message indicates whether the mobile stations should transmit or receive using the allocated radio resources.

The base station in one example allocates a contiguous allocation of resource blocks for the uplink transmission. In another example, the base station allocates a non-contiguous allocation of resource blocks for the uplink transmission. In some embodiments, the base station performs carrier aggregation of two or more carriers (e.g., uplink carriers). In this case, the allocation of resource blocks can include resource blocks on two or more adjacent uplink carriers.

Figure 3:
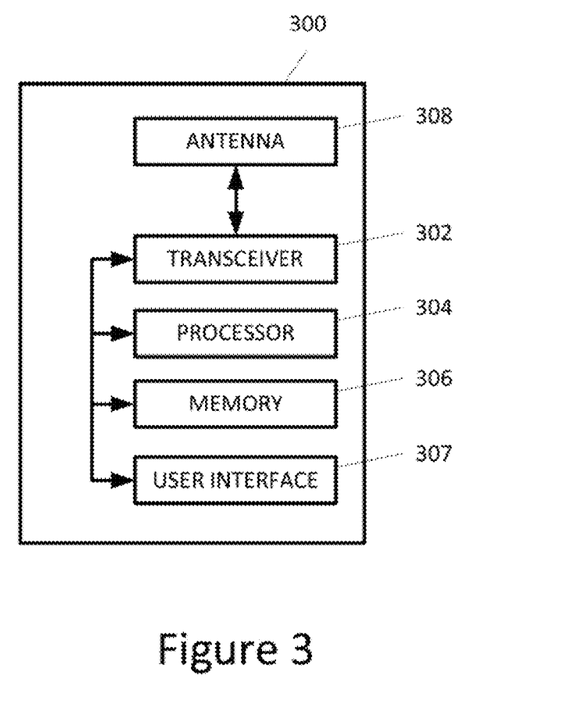
FIG. 3 is a generalized schematic of a representative mobile station.

Turning to FIG. 3, a block diagram 300 depicts a possible implementation of the mobile station 105 of FIG. 1. The mobile station includes a transceiver 302 configured to transmit data to and receive data from other devices such as the base station 120. The mobile station also includes a processor 304 that executes stored programs and at least one memory 306. The processor 304 writes data to and reads data from the memory 306. The mobile station includes a user interface 307 having a keypad, display screen, touch screen, microphone, speaker, or the like. During operation, the transceiver 302 receives data from the processor 304 and transmits RF signals representing the data via an antenna 308. Similarly, the transceiver 302 receives RF signals, converts the RF signals into appropriately formatted data, and provides the data to the processor 304. The processor 304 retrieves instructions from the memory 306 and, based on those instructions, provides outgoing data to, or receives incoming data from, the transceiver 302.

In an embodiment, the user interface 307 displays the output of various application programs executed by the processor 304. The user interface 307 additionally includes on-screen buttons that the user can press in order to cause the mobile station to respond. Content shown on the user interface 307 is generally provided to the user interface at the direction of the processor 304. Similarly, information received through the user interface 307 is provided to the processor 304, which may then cause the mobile station to carry out a function whose effects may or may not necessarily be apparent to a user.

Figure 4:
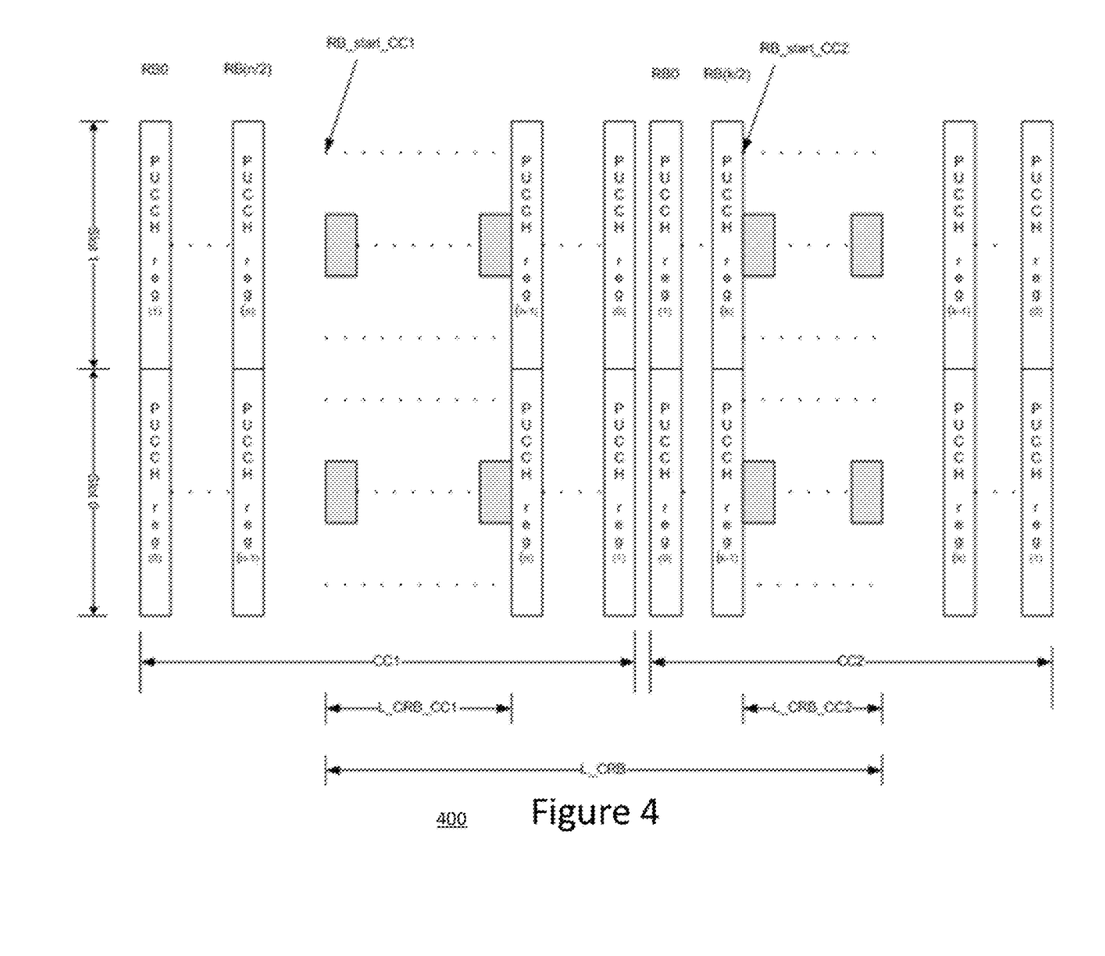
FIG. 4 is a generalized diagram illustrating a non-contiguous allocation of resource blocks for an uplink transmission by the mobile station of FIG. 1.

Turning to FIG. 4, diagram 400 illustrates a non-contiguous allocation of resource blocks for an uplink transmission by a mobile station, such as the mobile station 105. As shown, two adjacent component carriers ("CC1" and "CC2") include an allocation of resource blocks allocated by the base station for the uplink transmission. The allocation includes a first contiguous set of resource blocks on CC1, with a first resource block at RB_start_CC1 and bandwidth of L_CRB_CC1. The allocation also includes a second contiguous set of resource blocks on CC2, with a first resource block at RB_start_CC2 and bandwidth of L_CRB_CC2. The first and second sets of resource blocks are separated or "punctured" by resource blocks for the PUCCH on both CC1 and CC2. An overall bandwidth of the allocation is denoted as L_CRB, and includes the bandwidth of the first set of resource blocks, the bandwidth of the second set of resource blocks, and the resource blocks for the PUCCH on both CC1 and CC2.

For contiguous allocations, there are seven tables defined which specify allowed A-MPR values. The allowed A-MPR values for non-contiguous allocations are defined in seven formulas based on a carrier aggregation signaling value ("CA_NS"). The first of these formulas applies in the event that no CA_NS value is signaled. The six remaining ones are defined for use with the signaling of CA_NS_01, CA_NS_02, CA_NS_03, CA_NS_04, CA_NS_05, and CA_NS_06. To see the benefit of using the tables for contiguous allocations to specify A-MPR rather than the formulas for non-contiguous allocations, an example is described herein using an allocation ratio of 0.5. With the non-contiguous formulas, the allowed A-MPR is independent of specific allocations and is defined for each possible CA_NS value and also when the CA_NS has not been specified. For comparison, the A-MPR allowed for contiguous allocations (taken from the contiguous tables) is shown for the corresponding aggregation scenarios in Table 1. The A-MPR values shown are the smallest A-MPR values compatible with a contiguous allocation having an allocation ratio of 0.5. Note that it is possible to find contiguous allocations which require more A-MPR.

It can be noted in Third Generation Partnership Project Technical Specification 36.101 ("TS 36.101") that when CA_NS is signaled, A-MPR is used, and MPR is defined to be equal to 0. Conversely, when no CA_NS is signaled, maximum power reduction ("MPR") is used, and A-MPR is defined to be equal to 0. However, the method described below in which a second A-MPR is developed for non-contiguous resource allocations from the A-MPR defined for contiguous allocations can be applied with respect to MPR in the case that no NS_CA is signaled.

TABLE 1

A-MPR reduction from using contiguous A-MPR tables rather than non-contiguous A-MPR formula. (Note that MPR is used in the case that no CA_NS is signaled.)

| CA_NS signaled | A-MPR for A = 0.5 with non-contiguous formula | Minimum A-MPR for contiguous allocation with A = 0.5 (150 RBs) | Minimum A-MPR for contiguous allocation with A = 0.5 (200 RBs) | A-MPR reduction for contiguous allocation (150 RBs) | A-MPR reduction for contiguous allocation (200 RBs) |
|---|---|---|---|---|---|
| No CA_NS | 3.5 | 3 | 3 | 0.5 | 0.5 |
| CA_NS_01 | 9.5 | 5 | 6 | 4.5 | 3.5 |
| CA_NS_02 | 9.5 | 2 | 6 | 7.5 | 3.5 |
| CA_NS_03 | 11.5 | 5 | 7 | 6.5 | 4.5 |

TABLE 1-continued

A-MPR reduction from using contiguous A-MPR tables rather than non-contiguous A-MPR formula. (Note that MPR is used in the case that no CA_NS is signaled.)

| CA_NS signaled | A-MPR for A = 0.5 with non-contiguous formula | Minimum A-MPR for contiguous allocation with A = 0.5 (150 RBs) | Minimum A-MPR for contiguous allocation with A = 0.5 (200 RBs) | A-MPR reduction for contiguous allocation (150 RBs) | A-MPR reduction for contiguous allocation (200 RBs) |
|---|---|---|---|---|---|
| CA_NS_04 | 4.5 | 4 | 4 | 0.5 | 0.5 |
| CA_NS_05 | 9.5 | 5 | 6 | 4.5 | 3.5 |
| CA_NS_06 | 11.5 | 2 | 3 | 9.5 | 8.5 |

From Table 1, it is apparent that contiguous allocations can be found with an allocation ratio of 0.5 for which the allowed A-MPR is much less than that allowed by the non-contiguous formulas. In some cases, the A-MPR reduction resulting from the use of the A-MPR table for contiguous allocations can be as much as 9 dB. However, as noted above, it is not possible to have a contiguous allocation with allocation ratio greater than or equal to 0.5 in subframes in which a PUCCH is transmitted on either component carrier.

In some cases where the allocation of resource blocks is "almost contiguous," the A-MPR for a corresponding contiguous allocation can be used with an appropriate offset, or correction factor. An example of such an almost contiguous allocation would be an allocation that is contiguous except for the PUCCH region (e.g., a contiguous allocation from which the PUCCH resource blocks have been punctured as illustrated in FIG. 4). In other examples, the punctured resource blocks could be allocated to semi-persistently scheduled Physical Uplink Shared Channel ("PUSCH") resource blocks or for other purposes. More generally, a second non-contiguous A-MPR for any non-contiguous allocation can be derived from the A-MPR for a corresponding contiguous allocation with a correction factor, where the size of the correction factor depends on both the number of resource blocks in the corresponding contiguous allocation and the number of resource blocks punctured from the corresponding contiguous allocation. In some cases the second A-MPR derived from the corresponding contiguous allocation will be less than the non-contiguous A-MPR formula defined in TS 36.101, while in other cases, the second A-MPR will be greater than the non-contiguous A-MPR defined in TS 36.101.

For the non-contiguous allocation, the mobile station (or base station) determines an overall bandwidth of the allocation by filling in any gaps of unallocated resource blocks (e.g., L_CRB of FIG. 4). Equivalently, the overall bandwidth of the non-contiguous allocation can be defined as the bandwidth L_CRB (in resource blocks) of the smallest contiguous allocation that contains the non-contiguous allocation. For the contiguous allocation, the mobile station determines the allowed A-MPR from the appropriate contiguous allocation A-MPR table using the determined overall bandwidth. The mobile station then uses an allocation correction factor added to the A-MPR value obtained from the tables. The allocation correction factor ensures that the power spectral density of the non-contiguous allocation is the same or less than that of the corresponding contiguous allocation from which its A-MPR was derived. More specifically, the A-MPR for the non-contiguous allocation is increased by the ratio of the number of resource blocks in the contiguous allocation (e.g., the non-contiguous allocation with gaps filled in) to the number of resource blocks in the non-contiguous allocation.

As one example of calculating A-MPR for a non-contiguous allocation, let A-MPR-C denote the A-MPR allowed for a contiguous allocation of L resource blocks and A-MPR-NC2 denote the second A-MPR allowed for a corresponding non-contiguous allocation in which K resource blocks have been punctured out of the contiguous allocation of L resource blocks. In this case, the A-MPR-NC2 is determined as the A-MPR-C with an allocation correction factor A-MPR-CF:

$$\text{A-MPR-NC2} = \text{A-MPR-C} + \text{A-MPR-CF}$$

where $$\text{A-MPR-CF} = 10 * \log_{10}(L/(L-K)).$$

Since K of the resource blocks of the contiguous allocation of L resource blocks are punctured, it follows that number of resource blocks M allocated to the mobile station is equal to L−K. Thus, the correction factor A-MPR-CF can also be written as:

$$\text{A-MPR-CF} = 10 * \log_{10}(L/M).$$

We now consider the special case in which the non-contiguous allocation is punctured only by the PUCCH region. The resource-block allocation for the PUSCH transmissions in CC1 is such that the last allocated resource block is at the beginning of the higher frequency PUCCH region. In CC2, there is simultaneously a PUSCH transmission with RB_Start at the end of the lower frequency PUCCH region. According to TS 36.101, the A-MPR value for the aggregated component carriers is the allowed maximum output power reduction applied to transmissions on the Primary Component Carrier and the Secondary Component Carrier for contiguously aggregated component carriers. As illustrated in FIG. 4, L_CRB_CC1 and L_CRB_CC2 RBs start at RB_start1 and RB_start2, respectively. The A-MPR value is selected based on $L_{\_CRB}$ as follows:

$$L_{CRB} = L_{CRB\_CC1} + \text{PUCCH}_{HReg\_CC1} + \text{PUCCH}_{LReg\_CC2} + L_{CRB\_CC2}$$

The PUCCH region of each component carrier may be different but must have at least one resource block so that:

$$L_{CRB} > L_{CRB\_CC1} + L_{CRB\_CC2}$$

The mobile station first computes A-MPR as if it were assigned the PUCCH region resource blocks so that the allocation is contiguous. For allocations where $L_{\_CRB}$ includes the PUCCH transmission region, the mobile station must add an additional correction factor of:

$$A\text{-}MPR\text{-}CF = 10 * \log 10(L_{CRB}/(L_{CRB} - PUCCH_{RegT}))$$

$$A\text{-}MPR_{PUCCH} = 10 * \log_{10}\left(\frac{L_{CRB}}{L_{CRB} - PUCCH_{RegT}}\right)$$

where:

$$PUCCH_{RegT} = PUCCH_{Reg\_CC1} + PUCCH_{Reg\_CC2}$$

so that A-MPR-NC2 is given by:

$$\text{A-MPR-NC2} = \text{A-MPR-C} + \text{A-MPR-CF}.$$

Equivalently, in this example in which the non-contiguous allocation is punctured only by the PUCCH, we have:

$$A\text{-}MPR\text{-}CF = $$
$$10 * \log_{10}(L_{CRB}/(L_{CRB} - PUCCH_{RegT})) = 10 * \log_{10}(L/(L-K)).$$

A specific example is now described for carrier aggregation for the 15 MHz+15 MHz case in combination with CA_NS_01 signaling. Each 15 MHz carrier has 75 resource blocks, so we number the resulting aggregated resource blocks 0, 1, . . . , 149. In this example, we assume that the mobile station is assigned a non-contiguous allocation of resource blocks 32 through 72 and 77 through 117. The number of resource blocks L in the smallest contiguous allocation containing this non-contiguous allocation is 82 resource blocks. The number of resource blocks K punctured from this smallest contiguous allocation is 4. The punctured resource blocks 73 and 74 may correspond to the higher frequency PUCCH region of the lower frequency component carrier, while the resource blocks 75 and 76 may correspond to the lower frequency PUCCH region of the higher frequency component carrier. From Table 6.2.4A.1-1 in TS 36.101 (shown below), the A-MPR for the contiguous allocation is 5 dB. For this example, the second non-contiguous A-MPR is thus given by:

$$A\text{-}MPR\text{-}NC2 = A\text{-}MPR\text{-}C + A\text{-}MPR\text{-}CF$$
$$= A\text{-}MPR\text{-}C + 10 * \log_{10}(L/(L-K))$$
$$= 5 + 10 * \log_{10}(82/78)$$
$$= 5.2 \text{ dB}.$$

TABLE 6.2.4A.1-1

(from TS 36.101): Contiguous Allocation A-MPR for CA_NS_01

| CA_1C: CA_NS_01 | RB_Start | L_CRB [RBs] | RB_start + L_CRB [RBs] | A-MPR for QPSK and 16-QAM [dB] |
|---|---|---|---|---|
| 100 RB/ 100 RB | 0-23 and 176-199 | >0 | n/a | ≤12.0 |
|  | 24-105 | >64 | n/a | ≤6.0 |
|  | 106-175 | n/a | >175 | ≤5.0 |
| 75 RB/ 75 RB | 0-6 and 143-149 | 0 < L_CRB ≤ 10 | n/a | ≤11.0 |
|  |  | >10 | n/a | ≤6.0 |
|  | 7-90 | >44 | n/a | ≤5.0 |
|  | 91-142 | n/a | >142 | ≤2.0 |

Note 1:
RB_start indicates the lowest RB index of transmitted resource blocks.
Note 2:
L_CRB is the length of a contiguous resource-block allocation.
Note 3:
For intra-subframe frequency hopping which intersects regions, notes 1 and 2 apply on a per slot basis.
Note 4:
For intra-subframe frequency hopping which intersects regions, the larger A-MPR value may be applied for both slots in the subframe.

For CA_NS_01, the A-MPR formula for non-contiguous resource allocations is given (See TS 36.101 section 6.2.4A.1) by the following:

$$M_A = -22.5A + 17; \quad 0 \leq A < 0.20$$

$$-11.0A + 14.7; \quad 0.20 \leq A < 0.70$$

$$-1.7A + 8.2; \quad 0.70 \leq A \leq 1$$

For this example, the allocation ratio A is equal to 0.52 (=78/150), so that the non-contiguous A-MPR is given by:

$$M_A = -11.0A + 14.7$$
$$= -11.0(0.52) + 14.7$$
$$= 8.98 \text{ dB}.$$

Accordingly, for this example, the A-MPR determined using the second non-contiguous method is 3.8 dB less than the A-MPR determined using the non-contiguous method specified in TS 36.101. Other examples of improved A-MPR values for various CA_NS values will be apparent to those skilled in the art.

One issue with the allocation correction factor described above is that for some cases, the allocation correction factor provides for a larger A-MPR than the allocation ratio-based method already defined in TS 36.101. The allocation correction factor tends to work well when the number of punctured resource blocks K is small in comparison to the number of resource blocks L in the smallest containing non-contiguous allocation so that the allocation correction factor is small. However, in cases in which the number of punctured resource blocks K is large in comparison to the number of contiguous resource blocks in which it is embedded, the second non-contiguous method for determining A-MPR can perform poorly in that it allows much more A-MPR than is necessary in order to meet the emissions requirements. The reason for this poor performance is due to the fact that if the transmit power is reduced by the allocation correction factor (which is large when L−K<<L) in order to maintain the same spectral density as for the corresponding contiguous allocation (for those resource blocks that are not punctured), then the transceiver of the mobile station (or a power amplifier therein) is operating in a much more linear region in which spectral regrowth due to power amplifier non-linearity is greatly reduced. As a result, when L−K is small relative to L, the extra power reduction is much more than is necessary in order to meet emissions requirements.

A second example is now described for carrier aggregation for the 15 MHz+15 MHz case in combination with CA_NS_01 signaling. For this example, only the outer-most two resource blocks are allocated for the PUSCH. In this example, the number of resource blocks L of the smallest contiguous allocation containing the two allocated resource blocks is 150, the number of punctured resource blocks K is 148, and the allocation ratio is A=2/150=0.133. For CA_NS_01, the A-MPR formula for non-contiguous resource allocations (See TS 36.101 section 6.2.4A.1) yields:

$$M_A = -22.5A + 17$$
$$= -22.5(0.133) + 17$$
$$= 16.7$$

Thus, for this example, the A-MPR formula in TS 36.101 gives an A-MPR value equal to 16.7 dB.

Using the second non-contiguous method described above, the A-MPR is determined for the smallest contiguous allocation containing the non-contiguous allocation containing the non-contiguous allocation. For this example, the number of resource blocks L of the smallest containing contiguous allocation is 150. From Table 6.2.4A.1-1 in TS 36.101, the A-MPR for this contiguous allocation is 6 dB. The second A-MPR is then determined by adding a correction factor to this contiguous A-MPR. In this case, the number of resource blocks L for the smallest containing contiguous allocation is 150, and the number of punctured resource blocks K is 148, so that the second non-contiguous A-MPR is given by:

$$A\text{-}MPR\text{-}NC2 = A\text{-}MPR\text{-}C + 10 * \log_{10}(L/(L-K))$$
$$= 6 + 10 \log_{10}(150/2)$$
$$= 24.7 \text{ dB}.$$

Accordingly, the A-MPR determined using the second non-contiguous method is 8 dB greater than the A-MPR determined using the non-contiguous method. Thus, for this example, the existing method for computing A-MPR in TS 36.101 for computing A-MPR for non-contiguous allocations is preferred to the non-contiguous method because the resulting A-MPR is less.

As a result of the above two examples, it can be observed that for some examples the A-MPR for the second non-contiguous method is less than the A-MPR for the non-contiguous method, and for some examples the A-MPR for the second non-contiguous method is greater than for the non-contiguous method. In some cases, it may be desirable to only allow the second non-contiguous method for non-contiguous allocations in which the only the PUCCH resource blocks are punctured from the corresponding contiguous allocations. Alternatively, it may be desirable to allow the second contiguous method only for non-contiguous allocations for which the correction factor A-MPR-CF is less than some maximum value. It can be noted that a limitation on A-MPR-CF is equivalent to a limitation on the ratio L/(L−K) for the non-contiguous allocation, where L is the number of resource blocks in the smallest contiguous allocation containing the non-contiguous allocation, and where K is the number of resource blocks punctured from the allocation. Similarly, a limitation on A-MPR-CF is equivalent to a limitation on the ratio L/M for the non-contiguous allocation, where M=L−K. Finally, in cases in which the allowed A-MPR is rounded up to the next 0.5 dB, the log function can be implemented as a set of thresholds applied to the ratio L/(L−K), or equivalently L/M, where a ratio that falls between two such thresholds is assigned a correction factor A-MPR-CF which is the appropriate multiple of 0.5 dB.

Figure 5:
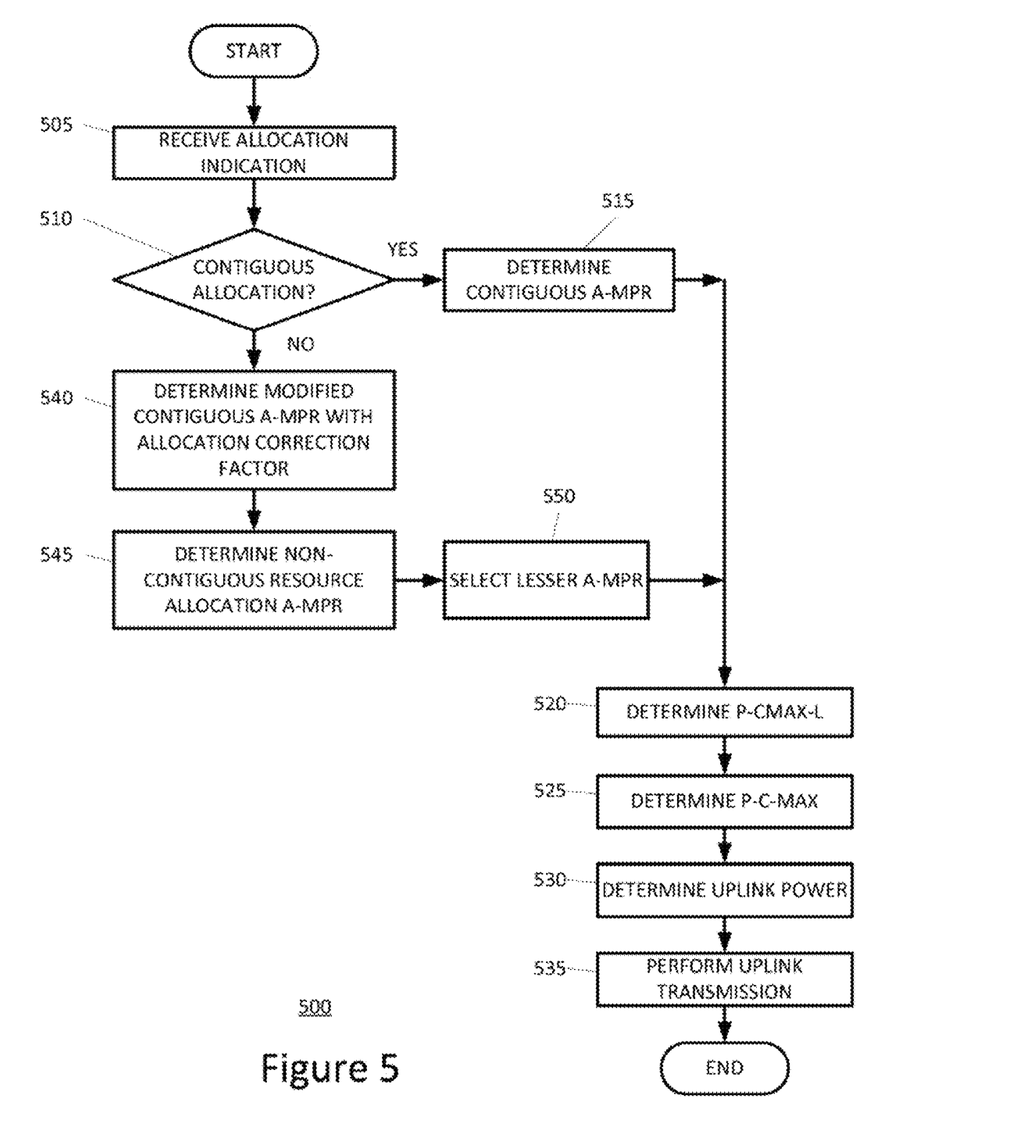
FIG. 5 is a flowchart of a method for calculating an uplink transmission power carried out by a mobile station of FIG. 1, according to an embodiment.

Turning to FIG. 5, a flowchart 500 of a method for calculating an uplink transmission power is shown. The method may be carried out by a mobile station of FIG. 1. The mobile station selects a minimum of two A-MPR values for determination of uplink transmission power. The mobile station receives (Step 505) an allocation indication from the base station. The allocation indication in one example is a control message that indicates radio resources (e.g., resource blocks) allocated to the mobile station by the base station. The mobile station determines (Step 510) whether the allocation is a contiguous allocation.

If the allocation is contiguous (YES at Step 510), then the mobile station determines (Step 515) a contiguous A-MPR using the contiguous allocation tables as defined in TS 36.101. For uplink carrier aggregation, the mobile station is allowed to set its configured maximum output power $P_{CMAX,c}$ for a serving cell c (e.g., for a cell provided by the base station) and also its total configured maximum output power $P_{CMAX}$, as described in TS 36.101 (see section 6.2.5A). The total configured maximum output power $P_{CMAX}$ is to be set between $P_{CMAX\_L} \leq P_{CMAX} \leq P_{CMAX\_H}$. The mobile station determines (Step 520) lower bound $P_{CMAX\_L}$ based on the contiguous A-MPR according to TS 36.101. The mobile station then determines (Step 525) the $P_{CMAX}$ based on the $P_{CMAX\_L}$ and determines (Step 530) the uplink transmission power. The mobile station performs (Step 535) the uplink transmission based on the uplink transmission power.

If the allocation is not contiguous (NO at Step 510), then the mobile station determines (Step 540) a first A-MPR as a modified contiguous A-MPR with an allocation correction factor. In this case, the first A-MPR is based on a smallest contiguous allocation containing the non-contiguous allocation and the allocation correction factor. The mobile station determines the smallest contiguous allocation by filling in any gaps of unallocated resource blocks in the allocation; however, the "smallest contiguous allocation" is not actually allocated and is thus a hypothetical smallest contiguous allocation, as will be understood by those skilled in the art. The mobile station uses the smallest contiguous allocation containing the non-contiguous allocation to determine a contiguous A-MPR using the contiguous allocation tables as defined in TS 36.101. The contiguous allocation table lookup is based on at least one of a starting index of the non-contiguous allocation, an ending index of the non-contiguous allocation, the number M of allocated resource blocks in the non-contiguous allocation, or a modulation and coding scheme for the uplink transmission.

The mobile station determines the allocation correction factor based on a ratio of a number L of resource blocks in the smallest contiguous allocation containing the non-contiguous allocation to a number M of resource blocks in the non-contiguous allocation. For example, the mobile station determines the allocation correction factor as $10 \log_{10} (L/M)$. The mobile station determines the first A-MPR as a sum of the contiguous A-MPR and the allocation correction factor.

The mobile station determines (Step 545) a second A-MPR as a non-contiguous resource allocation A-MPR for the allocation. For example, the mobile station calculates the A-MPR by performing a predetermined function based on the allocation ratio, as described in TS 36.101. The mobile station determines the allocation ratio as a ratio of a number M of resource blocks in the non-contiguous allocation to a maximum number $N_{RB\_agg}$ of aggregated resource blocks available for the uplink transmission. The maximum number may be for a single carrier (e.g., 25 resource blocks for a 5 MHz carrier) or for multiple aggregated carriers (e.g., 150 resource blocks for two aggregated 15 MHz carriers). The mobile station selects the predetermined function based on the CA_NS value. For example, the mobile station determines a maximum output power $M_A$ based on the allocation ratio and the functions defined in TS 36.101 Sections 6.2.3A and 6.2.4A. After determination of the first and second A-MPRs (Steps 540 and 545), the mobile station selects (Step 550) a lesser of the first and second A-MPRs. The mobile station then determines the A-MPR according to A-MPR=CEIL {Z, 0.5}, where Z is the lesser of the first and second A-MPRs. In another example, the mobile station applies the CEIL function to the first A-MPR and the second A-MPR prior to selecting the lesser of the first and second A-MPRs.

The mobile station calculates the uplink transmission power based on the selected A-MPR. For example, the mobile station performs Steps 520, 525, and 530 using the selected A-MPR instead of the contiguous A-MPR. The mobile station then performs (Step 535) the uplink transmission based on the uplink transmission power.

Figure 6:
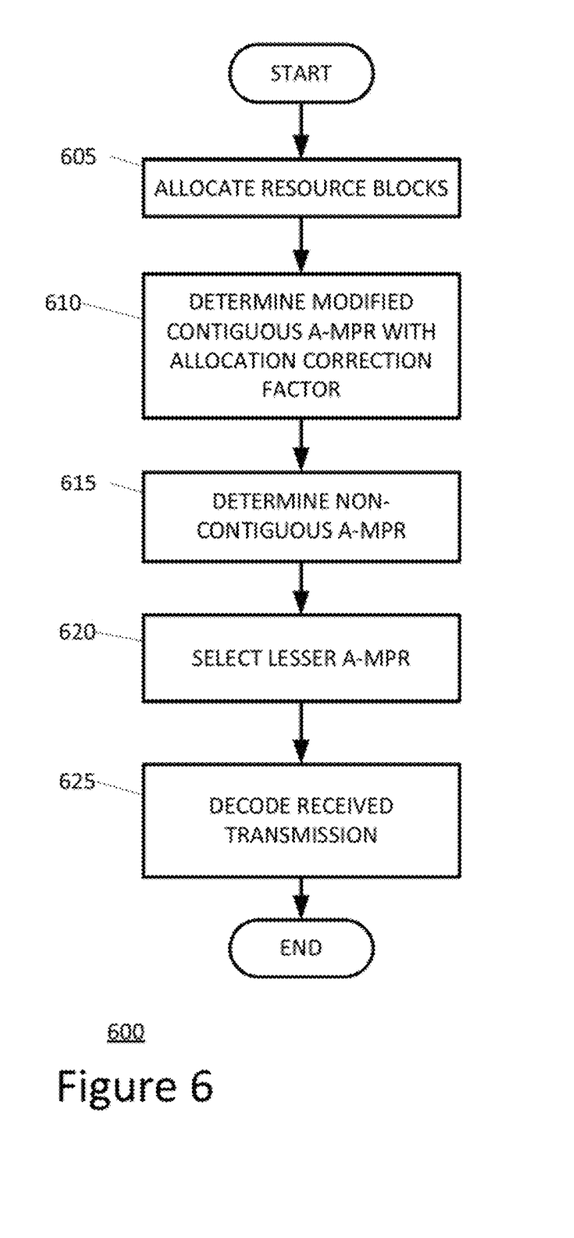
FIG. 6 is a flowchart of a method for decoding an uplink transmission carried out by a base station of FIG. 1, according to an embodiment.

Turning to FIG. 6, a flowchart 600 of a method for decoding an uplink transmission is shown. The method may be carried out by a base station of FIG. 1. The base station allocates (Step 605) a non-contiguous allocation of resource blocks for the uplink transmission from the mobile station. The base station sends an indication of the allocated resource blocks to the mobile station (e.g., via a control message).

The base station determines (Step 610) a first A-MPR based on a smallest contiguous allocation containing the non-contiguous allocation and an allocation correction factor. The base station determines the allocation correction factor based on a ratio of a number L of resource blocks in the smallest contiguous allocation to a number M of resource blocks in the non-contiguous allocation. For example, the base station determines the allocation correction factor as $10 \log_{10}$ (L/M). The base station determines the first A-MPR as a sum of the contiguous A-MPR and the allocation correction factor.

The base station determines (Step 615) a second A-MPR as a non-contiguous A-MPR for the non-contiguous allocation. For example, the base station calculates the A-MPR by performing a predetermined function based on the allocation ratio, as described in TS 36.101. The base station determines the allocation ratio as a ratio of a number M of resource blocks in the non-contiguous allocation to a maximum number $N_{RB\_agg}$ of aggregated resource blocks available for the uplink transmission. The base station selects the predetermined function based on the CA_NS value. For example, the base station determines a maximum output power $M_A$ based on the allocation ratio and the functions defined in TS 36.101 Sections 6.2.3A and 6.2.4A. The base station then determines the second A-MPR according to MPR=CEIL $\{M_A, 0.5\}$.

The base station selects (Step 620) a lesser of the first and second A-MPRs. The base station decodes (Step 625) a received uplink transmission based on the non-contiguous allocation of resource blocks and the selected A-MPR. For example, the base station receives the uplink transmission using the allocated resource blocks. In some embodiments, the base station selects a modulation and coding scheme based on the selected A-MPR. The base station sends the selected MCS to the mobile station in the control message and decodes the uplink transmission using the selected MCS. The base station also performs channel estimation, including path loss estimation, for the uplink transmission based on the selected A-MPR.

The disclosed embodiments may be described in terms of functional block components and various processing steps. Such functional blocks may be realized by any number of hardware or software components configured to perform the specified functions.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method in a mobile station for a long term evolution network, the method comprising:
receiving an indication of a non-contiguous allocation of resource blocks for an uplink transmission;
determining a first additional maximum power reduction ("A-MPR") based on a smallest contiguous allocation containing the non-contiguous allocation and an allocation correction factor;
determining a second A-MPR as a non-contiguous A-MPR for the non-contiguous allocation;
calculating an uplink transmission power based on a lesser of the first A-MPR and the second A-MPR; and
performing the uplink transmission based on the uplink transmission power.

2. The method of claim 1 wherein determining the first A-MPR comprises:
determining a contiguous A-MPR for the smallest contiguous allocation containing the non-contiguous allocation based on a contiguous allocation table lookup;
determining the allocation correction factor based on a ratio of a number L of resource blocks in the smallest contiguous allocation to a number M of resource blocks in the non-contiguous allocation; and
determining the first A-MPR as a sum of the contiguous A-MPR and the allocation correction factor.

3. The method of claim 2 wherein the allocation correction factor is $10 \log_{10}$ (L/M).

4. The method of claim 2 wherein the contiguous allocation table lookup is based on at least one of: a starting index of the non-contiguous allocation, an ending index of the non-contiguous allocation, the number M of allocated resource blocks in the non-contiguous allocation, and a modulation and coding scheme for the uplink transmission.

5. The method of claim 1 wherein determining the second A-MPR comprises performing a predetermined function based on an allocation ratio of the non-contiguous allocation.

6. The method of claim 5 further comprising determining the allocation ratio as a ratio of a number M of resource blocks in the non-contiguous allocation to the maximum number $N_{RB\_agg}$ of aggregated resource blocks available for the uplink transmission.

7. The method of claim 6 further comprising selecting a non-contiguous resource allocation A-MPR function based on a carrier aggregation network signaling value.

8. A method in a mobile station for a long term evolution network, the method comprising:
receiving an indication of a resource allocation of resource blocks for an uplink transmission;
determining whether the resource allocation is contiguous;
determining a contiguous additional maximum power reduction ("A-MPR") as a selected A-MPR if the resource allocation is a contiguous allocation;
if the resource allocation is a non-contiguous allocation:
determining an allocation correction factor based on a ratio of a bandwidth L of resource blocks of a smallest contiguous allocation containing the non-contiguous allocation to a number M of allocated resource blocks in the non-contiguous allocation;
determining a modified contiguous A-MPR for the non-contiguous allocation by adding the allocation correction factor to an A-MPR for the smallest contiguous allocation containing the non-contiguous allocation;
determining a non-contiguous A-MPR by performing a predetermined function based on the allocation ratio of the non-contiguous allocation; and
selecting a lesser of the modified contiguous A-MPR and the non-contiguous A-MPR as the selected A-MPR;
calculating an uplink transmission power based on the selected A-MPR; and performing the uplink transmission based on the uplink transmission power.

9. The method of claim 8 wherein determining the contiguous A-MPR comprises performing a contiguous allocation table lookup based on the bandwidth L of the smallest contiguous allocation containing the non-contiguous allocation.

10. The method of claim 8 further comprising:
determining an allocation ratio as a ratio of a number M of allocated resource blocks in the resource allocation to a maximum number $N_{RB\_agg}$ of aggregated resource blocks available for the uplink transmission; and
determining the non-contiguous A-MPR based on a table lookup with the allocation ratio.

11. The method of claim 8 wherein determining the modified contiguous A-MPR comprises:
performing a contiguous allocation table lookup based on the bandwidth L of the smallest resource allocation to determine the contiguous A-MPR; and
determining the modified A-MPR as a sum of the contiguous A-MPR and the allocation correction factor.

12. The method of claim 11 further comprising determining the non-contiguous A-MPR based on a table lookup.

13. The method of claim 11 wherein the allocation correction factor is $10 \log_{10} (L/M)$.

14. A method in a base station for a long term evolution network, the method comprising:
allocating a non-contiguous allocation of resource blocks for an uplink transmission from a mobile station;
determining a first additional maximum power reduction ("A-MPR") based on a smallest contiguous allocation containing the non-contiguous allocation and an allocation correction factor;
determining a second A-MPR as a non-contiguous A-MPR for the non-contiguous allocation; and
decoding the uplink transmission based on the non-contiguous allocation of resource blocks and a lesser of the first A-MPR and the second A-MPR.

15. The method of claim 14 further comprising selecting a modulation and coding scheme for the uplink transmission based on the lesser of the first A-MPR and the second A-MPR.

16. The method of claim 14 wherein decoding the uplink transmission comprises performing channel estimation for the uplink transmission based on the lesser of the first A-MPR and the second A-MPR.

17. The method of claim 14 wherein determining the first A-MPR comprises:
determining a contiguous A-MPR for the smallest contiguous allocation based on a contiguous allocation table lookup;
determining the allocation correction factor based on a ratio of a number L of resource blocks in the smallest contiguous allocation to a number M of resource blocks in the non-contiguous allocation; and
determining the first A-MPR as a sum of the contiguous A-MPR and the allocation correction factor.

18. The method of claim 17 wherein the allocation correction factor is $10 \log_{10} (L/M)$.

19. The method of claim 14 wherein determining the second A-MPR comprises performing a predetermined function based on an allocation ratio of the non-contiguous allocation.

20. The method of claim 19 further comprising determining the allocation ratio as a ratio of a number M of resource blocks in the non-contiguous allocation to a maximum number $N_{RB\_agg}$ of aggregated resource blocks available for the uplink transmission.

* * * * *